(12) United States Patent
Lea

(10) Patent No.: US 10,033,540 B2
(45) Date of Patent: Jul. 24, 2018

(54) HANDOFF FREE WIRELESS NETWORK ARCHITECTURE

(71) Applicant: The Hong Kong University of Science and Technology, Hong Kong (CN)

(72) Inventor: Chin Tau Lea, New Territories (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 252 days.

(21) Appl. No.: 14/736,786

(22) Filed: Jun. 11, 2015

(65) Prior Publication Data

US 2016/0028554 A1 Jan. 28, 2016

Related U.S. Application Data

(60) Provisional application No. 61/999,353, filed on Jul. 24, 2014.

(51) Int. Cl.
*H04L 29/12* (2006.01)
*H04L 12/18* (2006.01)
(Continued)

(52) U.S. Cl.
CPC ........ *H04L 12/189* (2013.01); *H04L 61/2007* (2013.01); *H04W 12/02* (2013.01);
(Continued)

(58) Field of Classification Search
None
See application file for complete search history.

(56) References Cited

U.S. PATENT DOCUMENTS 6,977,938 B2 12/2005 Alriksson et al.
7,333,454 B2 2/2008 Yang et al.
(Continued)

FOREIGN PATENT DOCUMENTS

CA 2687288 A1 11/2008
CN 100502382 C 6/2009
(Continued)

OTHER PUBLICATIONS

Pontes, et al.. "Handover Management in Integrated WLAN and Mobile WiMAX Networks", Recent Advances and Evolution of WLAN and WMAN Standards, IEEE Wireless Communications pp. 86-95, Oct. 2008.
(Continued)

*Primary Examiner* — Edan Orgad
*Assistant Examiner* — Sithu Ko
(74) *Attorney, Agent, or Firm* — Amin, Turocy & Watson, LLP

(57) ABSTRACT

An Internet protocol (IP) based wireless communication network is provided that enables device mobility without handoffs. In an aspect, mobile device of the network is configured to broadcast, via a multicast channel, an anchor router solicitation message comprising a mobile device identifier that identifies the mobile device. The mobile device then receives, via the multicast channel, an assigned IP address from an anchor router device near the mobile device based on detection of the anchor router solicitation message by the anchor router device. The mobile device further employs the assigned IP address to connect with one or more other router devices in response to movement of the mobile device to cell areas of the one or more other router devices of the network.

35 Claims, 14 Drawing Sheets

(51) Int. Cl.
*H04W 12/06* (2009.01)
*H04W 12/04* (2009.01)
*H04W 12/02* (2009.01)
*H04W 84/18* (2009.01)
*H04W 36/18* (2009.01)

(52) U.S. Cl.
CPC ........... *H04W 12/04* (2013.01); *H04W 12/06* (2013.01); *H04W 36/18* (2013.01); *H04W 84/18* (2013.01)

(56) References Cited

U.S. PATENT DOCUMENTS

| | | | |
|---|---|---|---|
| 7,593,377 | B2 | 9/2009 | Thubert et al. |
| 8,699,458 | B1 | 4/2014 | Breau et al. |
| 2003/0016655 | A1* | 1/2003 | Gwon ..................... H04L 45/00 370/352 |
| 2003/0018715 | A1* | 1/2003 | O'Neill ................. H04L 12/185 709/204 |
| 2005/0025091 | A1* | 2/2005 | Patel ..................... H04L 63/068 370/328 |
| 2005/0119001 | A1* | 6/2005 | Watanabe ......... H04W 36/0011 455/436 |
| 2007/0242638 | A1* | 10/2007 | Arkko ................ H04L 63/0823 370/331 |
| 2010/0011427 | A1* | 1/2010 | Zayas ..................... G06F 21/80 726/7 |
| 2012/0034921 | A1 | 2/2012 | Anigstein et al. |
| 2013/0315102 | A1* | 11/2013 | Kahng .................. H04L 61/103 370/254 |

FOREIGN PATENT DOCUMENTS

| | | |
|---|---|---|
| EP | 1111874 A1 | 6/2001 |
| EP | 2073483 A1 | 6/2009 |
| EP | 1329124 B1 | 5/2010 |
| JP | 2009302753 A | 12/2009 |
| KR | 20080077213 A | 8/2008 |
| WO | 2002033987 A2 | 4/2002 |

OTHER PUBLICATIONS

Thaenthong and Gordon, "Performance of Handovers between NEMO and Mobile Ad Hoc Networks Using Buffering", The institute of Electronic, Information and Communication Engineers, vol. E94-B, No. 10, Oct. 2011, pp. 2763-2775.

J. Scot Ransbottom, "Mobile Wireless System Interworking with 3G and Packet Aggregation for Wireless LAN", Apr. 22, 2004, 136 pgs.

\* cited by examiner

HANDOFF FREE WIRELESS NETWORK ARCHITECTURE

RELATED APPLICATION

This application claims priority to U.S. Provisional Patent Application No. 61/999,353 filed on Jul. 24, 2014, and entitled "A HANDOFF FREE WIRELESS NETWORK ARCHITECTURE." The entirety of the aforementioned application is incorporated by reference herein.

TECHNICAL FIELD

The subject disclosure relates to wireless communications, e.g., to an Internet protocol (IP) based wireless communication network that can seamlessly support a device's zooming without performing conventional handoff activities.

BACKGROUND

Internet telephony has succeeded in overcoming its initial barriers of low quality, non-ubiquitous hardware, and lack of interconnection. Today, Internet telephony is approaching wireline voice quality. Because use of the Internet significantly lowers costs in almost every aspect of telecommunications compared to a conventional telephone network (e.g., transmission costs, switching costs, etc.), the Internet has driven many conventional telephone operators out of business.

Many people predict IP-based mobile solutions, such as mobile IP (MIP), will have the same kind of impact on cellular operators because the current wireless networks, like their telephony counterparts, share many characteristics: complex architectures, highly inefficient bandwidth utilization, and high transport cost. Like their telephony counterparts, cellular networks cannot compare with the bandwidth and the cost efficiency offered by the Internet solutions. For example, it has been argued, a wireless fidelity (WiFi™) network, has a per-user capacity 10 to 50 times higher than that of a cellular network, but with less than 1% of the infrastructure cost. Studies have shown that WiFi's physical layer can support mobile users traveling at a speed of 60 to 80 Km/sec. Therefore, WiFi networks can potentially provide the services that are offered by current cellular operators at a significantly lower cost.

However this prediction has failed to materialize. WiFi routers have a limited transmission range (e.g., a few hundred meters in an outdoor area). This means that a handoff is triggered every 5 to 10 seconds in a WiFi-based wireless network. IP-based mobile solutions cannot seamlessly support this kind of handoffs. Some architectures have been proposed to reduce the handoff frequency. One example architecture segments a WiFi network into several domains and each domain has a gateway router for handling handoffs between domains. If a mobile node (MN) moves within a limited area, handoffs within a domain only trigger signaling messages exchanged among the routers inside the domain. However, many issues, such as security and packet loss during handoffs, are still not addressed with these architectures, and it is doubtful that they can support the kind of mobility provided by cellular networks. Another drawback with many IP-based approaches is that they do not address the data encryption issue after handoffs. The handing of encryption keys is a time consuming process in conventional wireless networks.

Thus, there is a need for a novel IP based wireless communication network architecture that can seamlessly support a device's zooming in a WiFi network and harvest the low-cost, abundant bandwidth of a WiFi network.

DETAILED DESCRIPTION

Figure 1:
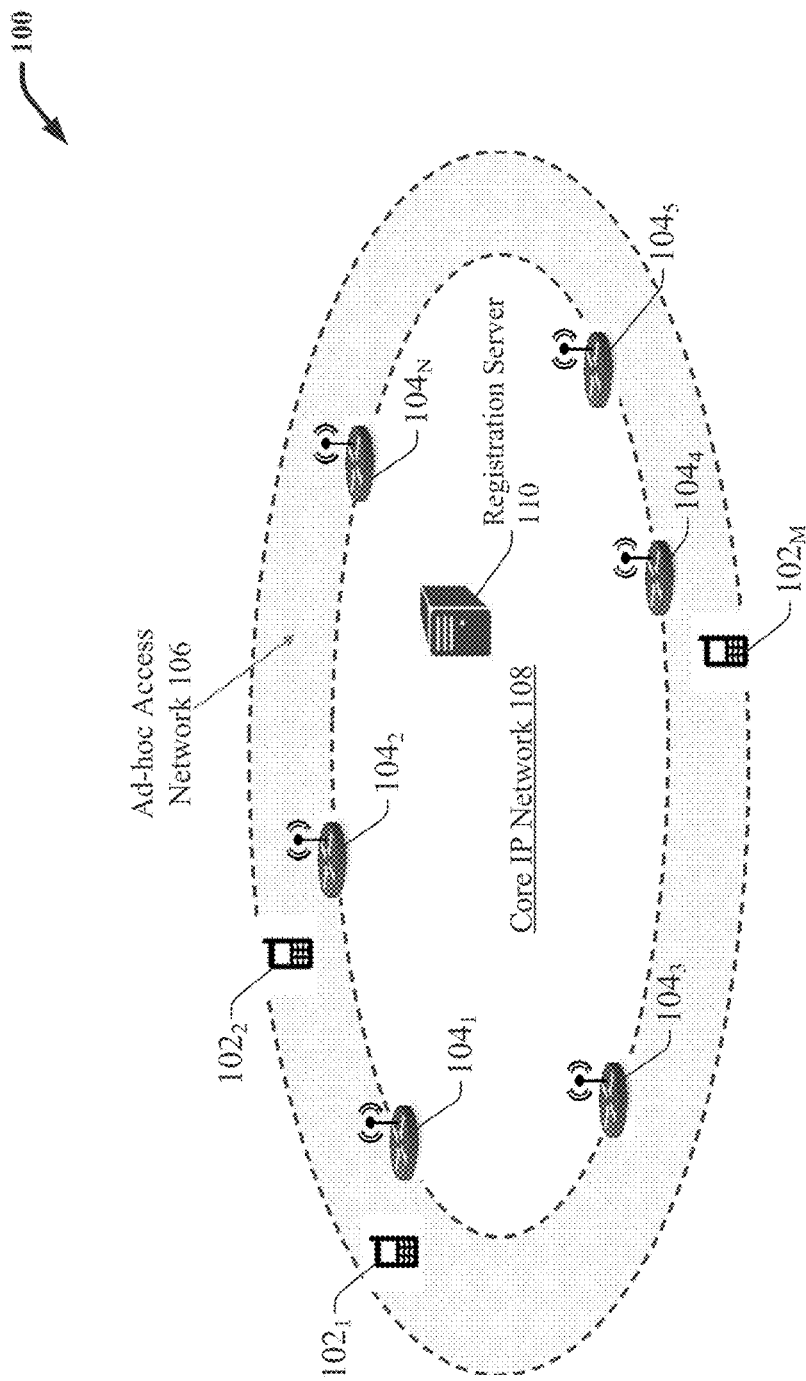
FIG. 1 illustrates an example system architecture of a handoff-free IP based wireless communication network in accordance with aspects and embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "server," "device," "router," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application program interface (API) components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile node," "mobile station," "mobile equipment," "wearable device," "primary device," secondary device," "subscriber device," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

The subject disclosure is directed to a handoff-free IP based wireless communication network (generally referred to herein as the "network"). With the subject network, mobile nodes (MNs) do not need to perform conventional handoffs while roaming. A handoff (also referred to as a handover) refers to the process of transferring an active call or data session from one access router (also referred to an access point or base station) in a wireless network to another. A well-implemented handoff is important for delivering uninterrupted service to a caller or data session user.

A handoff in a conventional IP-based network contains two layers, generally referred to as a layer-2 handoff and layer-3 handoff, respectively. The layer-2 handoff in a conventional IP based network involves channel probing, authentication and association, and creation of a new encryption key. The layer-3 handoff involves getting a new care-of IP address, setting up a temporary tunnel between the old and the new agents (i.e routers), authentication, and updating the location information with the home agent. The overall time required to perform both handoff layers ranges from 3 to 15 seconds. As a result, many packets are lost during the handoff process.

The disclosed network eliminates these time consuming and insufficient handoff procedures. The disclosed network architecture employs a thin wireless access layer constructed on top of an IP network (e.g., the Internet), plus a registration server (RS) device that stores subscriber information for each subscribed/registered mobile node (MN), such as the MN device identifiers (IDs), pre-stored encryption keys (similar to the keys in SIM cards), etc. There is no additional network infrastructure for supporting mobility services. The simplicity of the architecture significantly reduces the construction cost of the network. The access layer includes a plurality of access router (AR) devices configured to receive data packets from MNs. Each AR is configured to provide wireless coverage for limited geographical areas, referred to herein as a cell. The ARs are connected to an IP backbone network (e.g., the Internet) through wired lines and the MNs connect to the ARs through wireless links. The IP backbone network is configured to transport data packets between the ARs and the RS.

Some distinctive features of the subject network include the following:

(1) the use of dynamic anchoring to assign an IP address to a MN;
(2) the anchoring of session keys at home routers (referred to herein as the anchored access router (aARs)) of a MN;
(3) the usage of a single-hop layer-3 ad hoc wireless network between MN and ARs; and
(4) the use of a reverse tunnel for a MN's traffic, (i.e., all traffic sent by a MN is tunneled backed to its aAR).

Dynamic anchoring allows a MN to acquire an IP address dynamically from different ARs. When the lifetime of its acquired IP address expires, the MN will acquire another IP address from a nearby AR. The AR from which a MN has acquired its IP address is classified herein as its aAR. The current AR that provides wireless coverage for a MN is called the current AR (cAR) of the MN.

The ad-hoc access network allows a MN to use the same IP address. This eliminates the need of acquiring an IP address, which is a time-consuming layer-3 handoff activity. The ad-hoc access network also provides a macrodiversity feature that eliminates the problem of packet loss when a MN moves to a new cell.

Session keys created between the RS and a MN will be anchored at the aAR of the MN. Using reverse tunneling, all traffic transmitted by a MN from anywhere in the network will be sent back to its aAR by its cAR. The aAR can perform the encryption/decryption function for the cAR. In other words, a cAR can outsource all encryption/decryption and authentication activities to the aAR of a MN. This eliminates authentication, and the encryption and key creation problem in conventional layer-2 and layer-3 handoffs.

The various schemes described above cannot work however if a MN is too far from its aAR because this will make the delay untolerable. Nevertheless, this issue is solved in the disclosed network via the use of dynamic anchoring, as dynamic anchoring guarantees that a MN and its aAR will not be too far from each other.

FIG. 1 illustrates an example system architecture of a handoff-free IP based wireless communication network 100 in accordance with aspects and embodiments described herein. Aspects of systems/networks, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

Network 100 includes a plurality of ARs $104_{1-N}$ and a plurality of MNs $102_{1-M}$ (where N and M are integers). The ARs $104_{1-N}$ are respectively connected to a core IP network 108 (e.g., the Internet) through wired backhaul links (not shown) and are configured to communicate with each other via the core IP network 110. The ARs $104_{1-N}$ are also connected to a one-hop ad-hoc access network 106 and are configured to communicate with MNs through the access network 106.

The number of ARs and MNs included in network 100 can vary. Each of the ARs $104_{1-N}$ are respectively associated with cells (not shown) and are particularly configured to provide wireless coverage for devices located within their respective cells. The coverage area of the cells can vary. For example, the coverage area of existing WiFi routers generally spans up to about 50 meters indoors and up to a few hundred meters outdoors. The area also changes with the specific 802.11 protocol ARs and MNs are using and with future advancements in WiFi AR technology. Further, the coverage area of two or more AR cells can overlap. The network 100 further includes a registration server 110, which stores users' registration information, and is configured to communicate with the respective ARs $104_{1-N}$ (and vice versa) via the core IP network 108.

Generally, the MN $102_{1-M}$, the ARs $104_{1-N}$, and registration server 110 can include memory that stores computer executable components and a processor that executes the computer executable components stored in the memory. Further, although registration server 110 is depicted as a single device, it should be appreciated that registration server 112 can include or employ a plurality of distributed and interconnected (e.g., either directly or via a network) devices.

Figure 2:
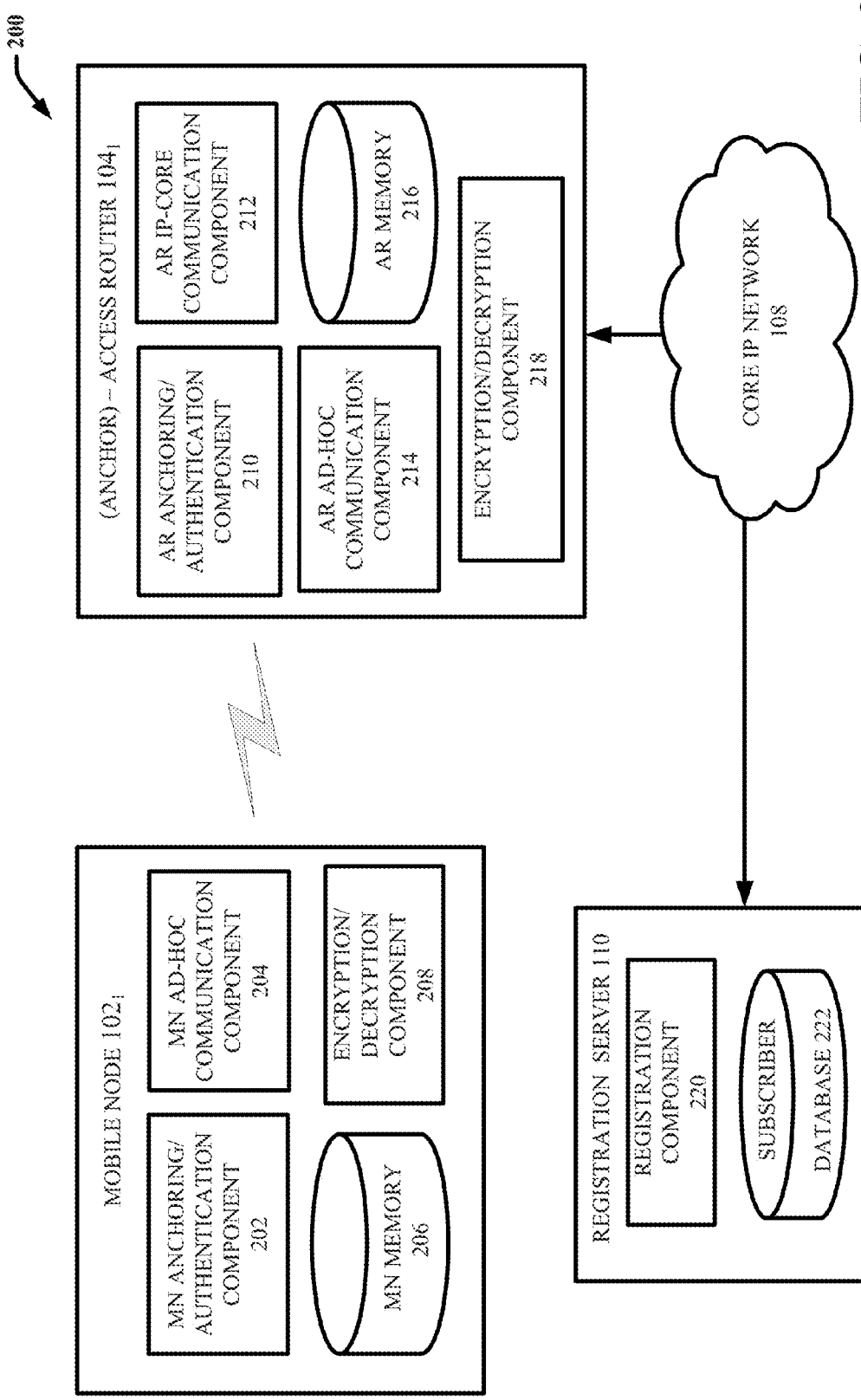
FIG. 2 presents a high level diagram of a mobile node (MN) and an access router (AR) in accordance with various aspects and embodiments of the disclosed handoff-free IP based wireless communication network.

FIG. 2 presents a high level diagram 200 of a MN and an AR in accordance with various aspects and embodiments of handoff-free IP based wireless communication network 100. Repetitive description of like elements employed in respective embodiments described herein is omitted for sake of brevity.

In order to connect to establish active media sessions (e.g., voice and/or voice/video calls) with other MNs, a MN must acquire an IP address first. Conventional MIP networks use static anchoring where a MN acquires an IP address from a fixed home agent (i.e. home router), which can be located in another country. In contrast, Network 100 uses dynamic anchoring where a MN acquires IP addresses dynamically from nearby ARs. Furthermore, a MN in Network 100 keep the same acquired IP address even when it moves into a new cell. The AR from which a MN has acquired its IP address is referred to herein as the MN's anchor AR (aAR). Each time an AR assigns an IP address to a MN, the AR also defines a lifetime for use of the IP address by the MN. Without this restriction on the lifetime of use for the IP address, the number of MNs anchored at an AR can grow indefinitely. Restricting the duration of use of an IP address by a MN also ensures that the MN will not travel too far away from its aAR. This feature is important for network 100 as all packets transmitted by a MN are sent back to its aAR (e.g., the concept referred to as reverse tunneling). When the lifetime of a MN's acquired IP address expires, the MN will acquire another IP address from a nearby AR.

Diagram 200 particularly depicts aspects of a MN (e.g., MN $102_1$) and an AR (e.g., AR $104_1$) of network 100 in association with dynamic anchoring and MN authorization. An AR of network 100 has at least two interfaces, one connected to the IP core 108, and another connected to the ad-hoc access network 106. The ARs $104_{1-N}$ communicate with the MNs $102_{1-M}$ through the one-hop ad-hoc access network 107. A set of control packets used for the construction of the ad-hoc access network are presented in FIG. 3.

Figure 3:
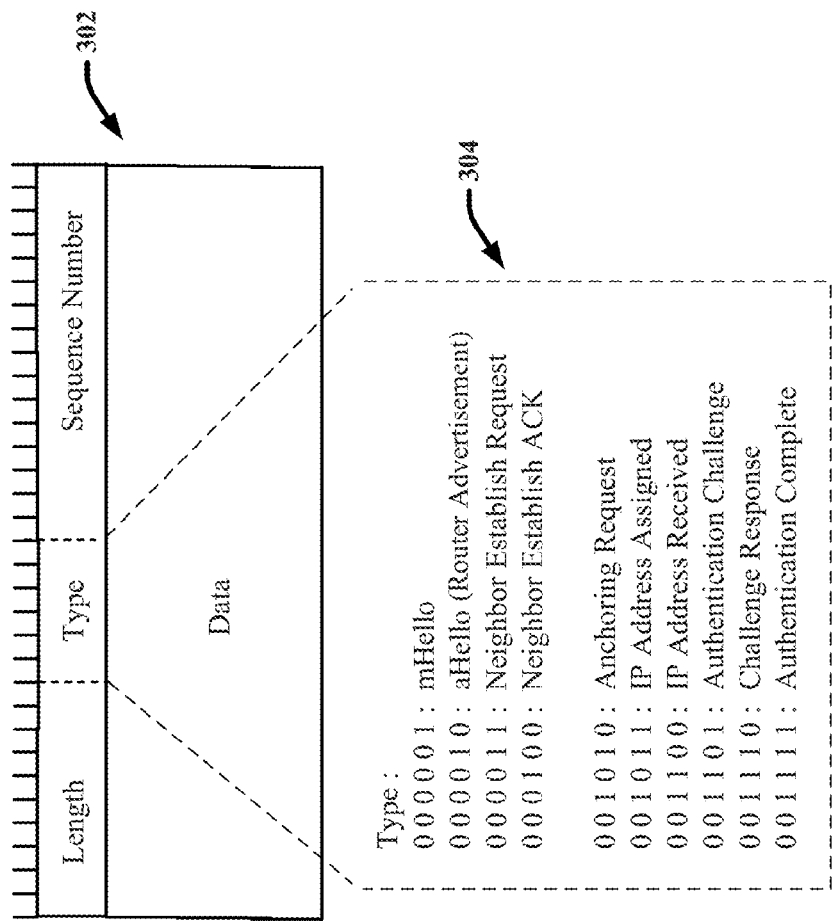
FIG. 3 presents example control packets sent by MNs and ARs of the disclosed handoff-free IP based wireless communication network in association with establishing an one-hop layer-3 ad hoc connection, in accordance with various aspects and embodiments described herein.

In particular, FIG. 3 depicts a standard control packet 302 with various fields including a type field. Call out box 304 lists several different types of control packets that can be entered into the type field of control packet 302. The various types of control packets can include but are not limited to the following: a mHello, an aHello or Router Advertisement, a Neighbor Establish Request, a Neighbor establish ACK, an Anchoring Request, an IP Address Assigned, an IP Address Received, an Authentication Challenge, a Challenge Response, and an Authentication complete. These control packets are communicated between the ARs $104_{1-N}$ and the MNs $102_{1-M}$ through a fixed user datagram protocol (UDP) port.

With reference back to FIG. 2, to facilitate dynamic anchoring, the respective MNs $102_{1-M}$ of network 100 can include MN anchoring/authentication component 202 and MN ad-hoc communication component 204, and the respective ARs $104_{1-N}$ can include AR anchoring/authentication component 210, AR IP-core communication component 212, and AR ad-hoc communication component 214.

In various embodiments, when a MN, (e.g., MN $102_1$) is turned on or needs to get an assigned IP address (because its previous IP address expired), the MN monitors a known IP multicast channel (i.e. a multicast address) and UDP port for a router advertisement message (e.g., also referred to herein as a mHello) that is sent periodically, (e.g., every 100 ms), by an AR (e.g., AR $104_1$). After receiving a router advertisement message, the MN anchoring/authentication component 202 is configured to direct the MN ad-hoc communication component 204 to send an anchoring-request message (see FIG. 3) to the AR $104_1$ using the same multicast channel. In response to reception of the anchoring-request message, the AR $104_1$ assigns an IP address to the MN $102_1$ using an IP address assigned packet (e.g., in real-time or substantially real-time) through the same multicast channel used by the AR $104_1$ to transmit the router advertisement message. In response to reception of the assigned IP address packet, the MN $102_1$ sends back to the AR $104_1$, an IP-address-received message/packet as an ACK. From now on, the AR $104_1$ and the MN $102_1$ will use the newly assigned IP address to complete the remaining steps of the anchoring process, which involve authentication of the MN $102_1$.

Note that in network 100, a IP address is assigned to a MN even before authentication of the MN is completed. This allows the MN $102_1$ and its aAR $104_1$ to complete the authentication process even when the MN $102_1$ moves into a new cell. The status of an un-authenticated IP address, however, will be marked or noted by the AR $104_1$ and/or the MN $102_1$ as "un-authenticated." A MN can only use an un-authorized IP address to send authentication related traffic through a fixed UDP (or TCP) port. Traffic received by an aAR from an un-authorized MN via other ports (e.g., not the fixed UDP or TCP port) are dropped by the aAR (note that all packets are sent back to the aAR). The restriction is removed after the authentication process is completed for the MN.

After receiving the confirmation from the MN $102_1$ that the assigned IP address is received, the AR $104_1$ then initiates the authentication process by instructing its AR anchoring/authentication component 210 to generate and send to the registration server 110 (e.g., via AR IP-core communication component 212), a registration request message to authenticate the MN $102_1$. The registration request message can include the identifier for the MN$102_1$ (e.g., its MAC address, etc.), the IP address assigned to the MN and the determined lifetime of the IP address. In one or more embodiments, the registration server 110 can include registration component 220 and subscriber database 222. The subscriber database 22 can store information uniquely identifying a user's registered MN (e.g. the MAC address (i.e. the physical address)) and a pre-stored key that is used to generate/deduce sessions keys when the user's MN is active. The registration component 220 also stores information that identifies the communication status of the MN, such as the aAR of the MN, the authentication status, etc.

In an aspect, in response to reception of the registration request message, the registration component 220 looks up the MN $102_1$ (e.g., via its identifier) in the subscriber database 222 to determine whether the MN $102_1$ is registered and authorized to employ the services of network 100. In response to determination that the MN $102_1$ is registered and authorized, the registration component 220 associates the assigned IP address with the MN $102_1$ (e.g., in the subscriber database 222), and returns a registration request acknowledgement (ACK) message back to the aAR $104_1$. This registration request acknowledgement message includes the following three key pieces of information: (1) a session key (referred to herein as Kc), (2) an authentication challenge (referred to as RAND as it contains a random variable), and (3) the correct response to the authentication challenge, (referred to as RES).

In response to reception of the registration request ACK message, aAR $104_1$ stores Kc (e.g., in AR memory 216). The aAR $104_1$ will use the Kc to encrypt and decrypt (e.g., via encryption/decryption component 218) packets exchanged with MN $102_1$ in the future. The AR anchoring/authentication component 210 further sends the RAND to the MN $102_1$ via an authentication challenge message. Upon reception of the authentication challenge message, the MN anchoring/authentication component 202 performs the following two actions: (1) transmitting a challenge-response message back to the aAR $104_1$ including the (correct) RES and (2) deriving the session key Kc from RAND and the pre-stored key shared between the mobile device and the registration server, and storing it in memory 208. The MN $102_1$ will also use Kc to encrypt and decrypt (e.g., via encryption/decryption component 208) packets exchanged with AR $104_1$ in the future. Once the challenge-response message is received by aAR $104_1$ and its AR anchoring/authentication component 210 determines that the RES included in the challenge-response message is correct, the authentication process is complete and the status of the assigned IP address is changed by the aAR $104_1$ to "authenticated." From now on, data transmissions between the aAR $104_1$ and the MN $102_1$ will be encrypted with Kc and the IP address can be used to transmit any type of data.

Note that with the disclosed system architecture, Kc stays with the aAR $104_1$ and the MN $102_1$ throughout the lifetime of the acquired IP address. In contrast, session keys in conventional wireless communication networks need to be handed over to each new AR when the MN moves into a new cell. If the MN $102_1$ fails to answer the authentication challenge correctly, the assigned IP address and the created session key Kc associated by the registration server 110 with the aAR $104_1$ and the MN $102_1$ (e.g., in the subscriber database) will be nullified and removed.

Each AR of network 100 can serve as an aAR for several MNs at one time. An AR of network 100 stores information about its anchored MNs in a table called the anchored MN list (aMNL) (e.g., in memory 216). The table includes information such as the identifier (ID) of the MN, the IP address and its lifetime, the session key Kc, and the current location of the MN. The location information refers to the IP address of the AP that is serving the cell in which the MN is currently located.

After MN $102_1$ is assigned its IP address by aAR $104_1$, as it moves around network 100 into different cells of network 100, it does not need to acquire a new IP address, (as done in MIP), to communicate with other users via the core IP network 108 (e.g., the Internet). Instead, MN $102_1$ uses the same IP address to set up a layer-3 ad hoc link with the AP serving the new area. MN $102_1$ can use the same IP address until the lifetime of the IP address expires (e.g., exceeds the limit set during the anchoring process). When that happens, the aAR removes the MN from its aMNL and de-registers the MN with the registration server 110. MN 102₁ can then get a new IP address from a nearby AR.

Figure 4:
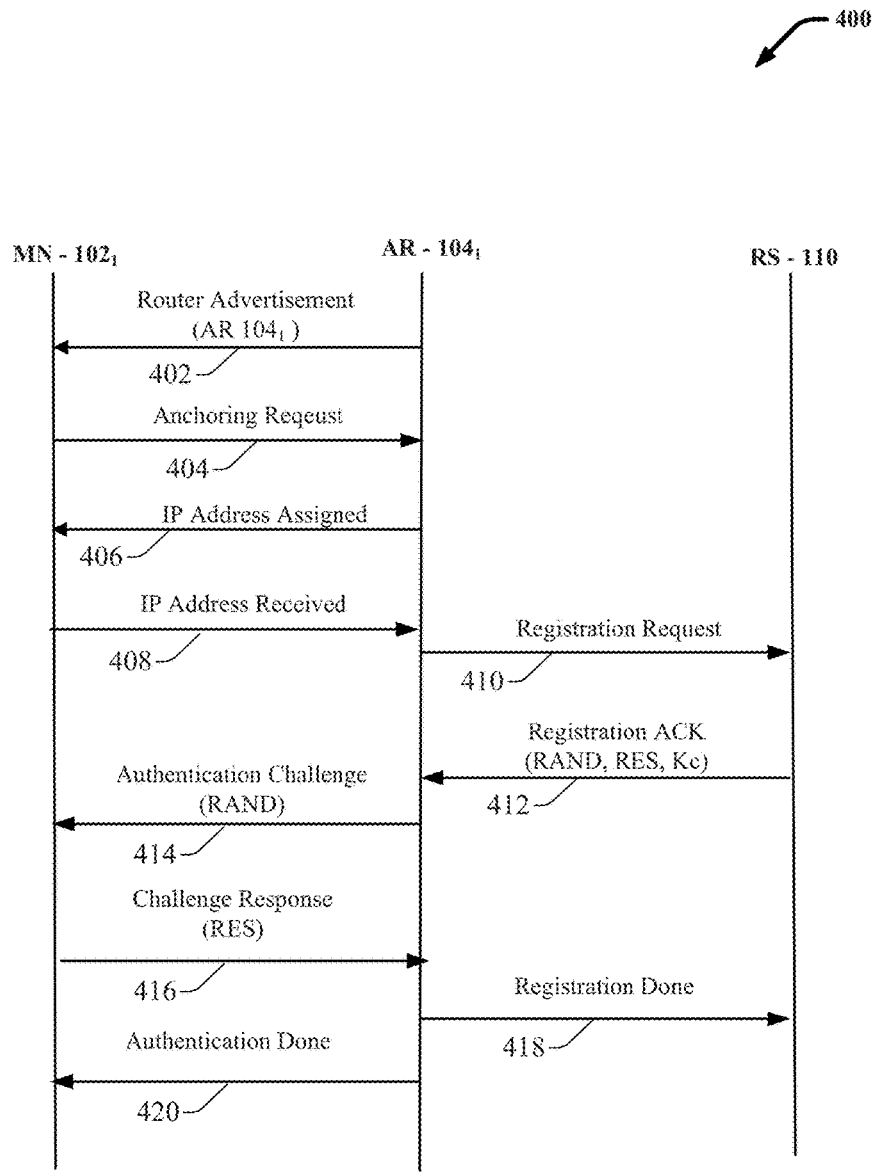
FIG. 4 presents a ladder diagram of an example dynamic anchoring and authentication flow between a MN, an AR and a RS in accordance with various aspects and embodiments of the disclosed handoff-free IP based wireless communication network.

FIG. 4 presents a ladder diagram 400 of an example dynamic anchoring and authentication flow between a MN, an AR and the RS in accordance with various aspects and embodiments of handoff-free IP based wireless communication network 100. Repetitive description of like elements employed in respective embodiments described herein is omitted for sake of brevity.

Ladder diagram 400 includes MN 102₁ and AR 104₁ and RS 112. At 402, router AR 104₁ broadcast the periodically transmitted router advertisement message through a known multicast channel. MN 102₁ is configured to respond to the received router advertisement message by sending, at 404, an anchoring request message including an identifier for MN 102₁ (e.g., a network access identity (NAI) or the MAC address) to router AR 104₁ At 406, in response to reception of the anchoring request message, the AR 104₁ assigns and sends an IP address to MN 102₁. This IP address is marked or noted as "un-authenticated" internally (e.g., by the AR 104₁, the MN 102₁ and/or the RS 112). At 408, MN 102₁ sends back an acknowledgement for the received IP address.

In an aspect, steps 402-408 are carried out through the known multicast channel which is designated for the anchoring process. The remaining steps 410-420 of the authentication process are carried out through the assigned IP address. These steps 410-420 of the authentication process can thus be performed even if/after the MN 102₁ moves to a new cell.

Figure 8:
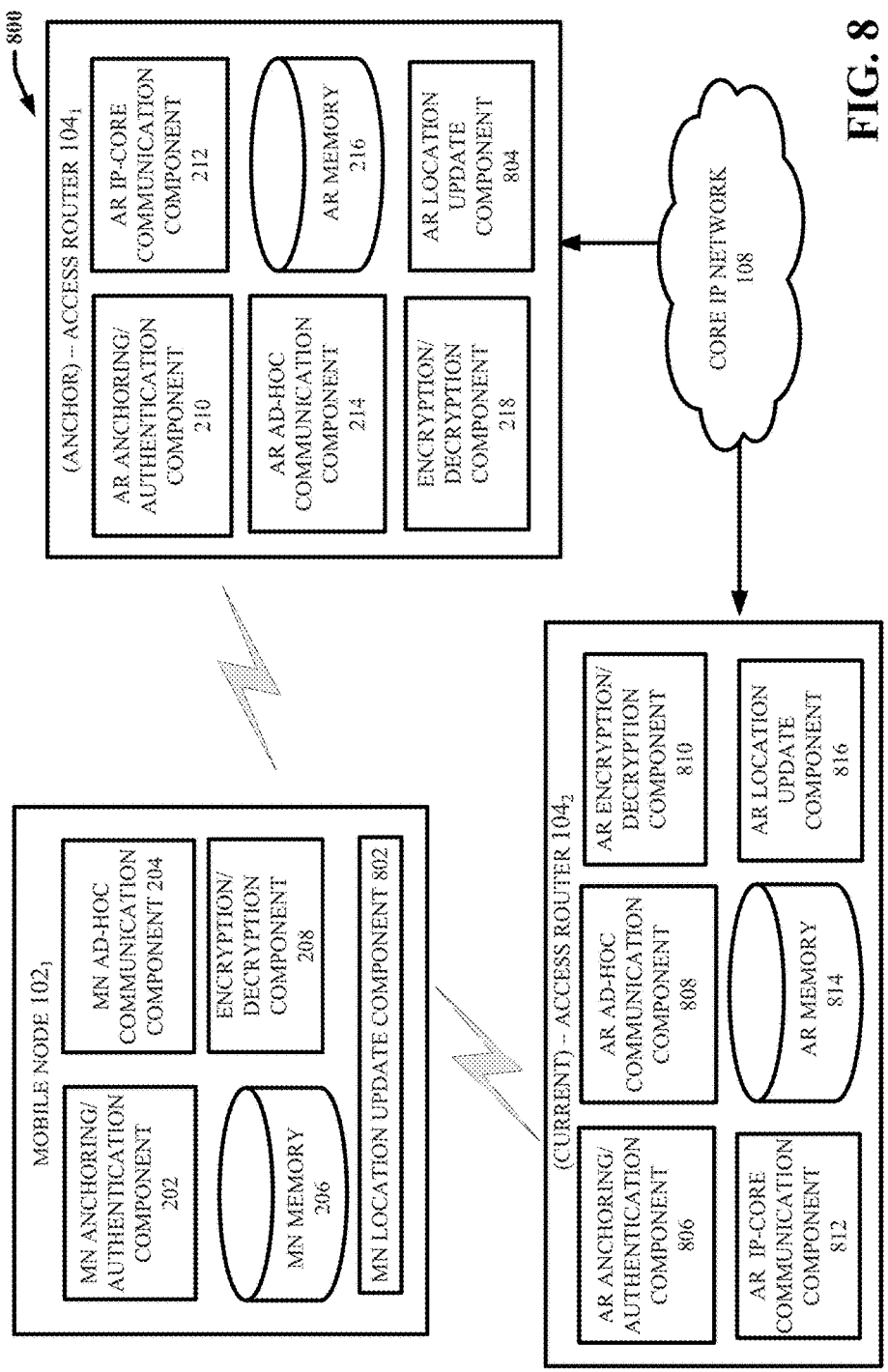
FIG. 8 presents a high level diagram of a MN, an AR serving as the MN's anchor AR (aAR), and another AR serving the MN's current AR (cAR), in accordance with various aspects and embodiments of the disclosed handoff-free IP based wireless communication network.

Continuing with diagram 400, at 410, AR 104₁ sends the RS 110 a registration request message. The registration request message can include the MN 102₁ identifier and the IP address of the AR 104₁ and its lifetime. At 412, the RS 110 sends a registration acknowledgement (ACK) message back to the AR 104₁ including the RAND, RES, and Kc. At 414, the AR 104₁ first retrieve the location information of the assigned IP address and then sends the authentication challenge message RAND to the MN 102₁. If MN 102₁ moves to another cell, then its new location information will be stored in a location update component (FIG. 8). At 416, in response to reception of the RAND, the MN 102₁ returns a challenge response message containing the correct response RES to the AR 104₁. In response to a determination that the received RES matches the RES that AR 104₁ received from the RS 110, at 418, the AR 104₁ sends the RS a notification indicating that registration of AR 104₁ as the MN's 102₁ aAR is complete. At 420, the AR 104₁ then sends the MN 102₁ a notification indicating that authentication is complete. In various embodiments, the dynamic anchoring and authentication process defined by diagram 400 is accomplished using some additional control packets as defined in FIG. 3.

Figure 5:
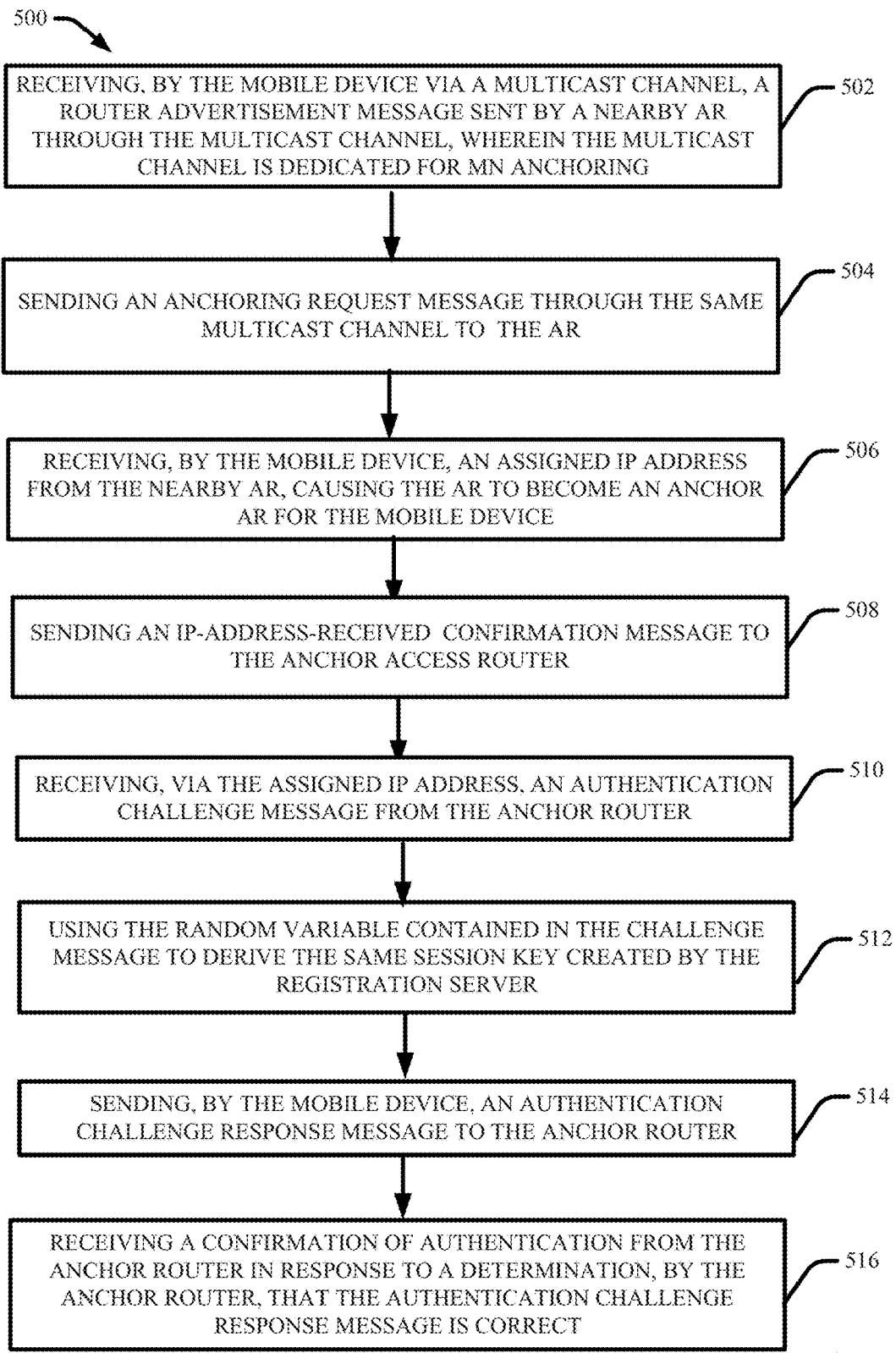
FIG. 5 presents an example method of dynamic anchoring and authentication performed by a mobile device in accordance with aspects and embodiments described herein.
Figure 6:
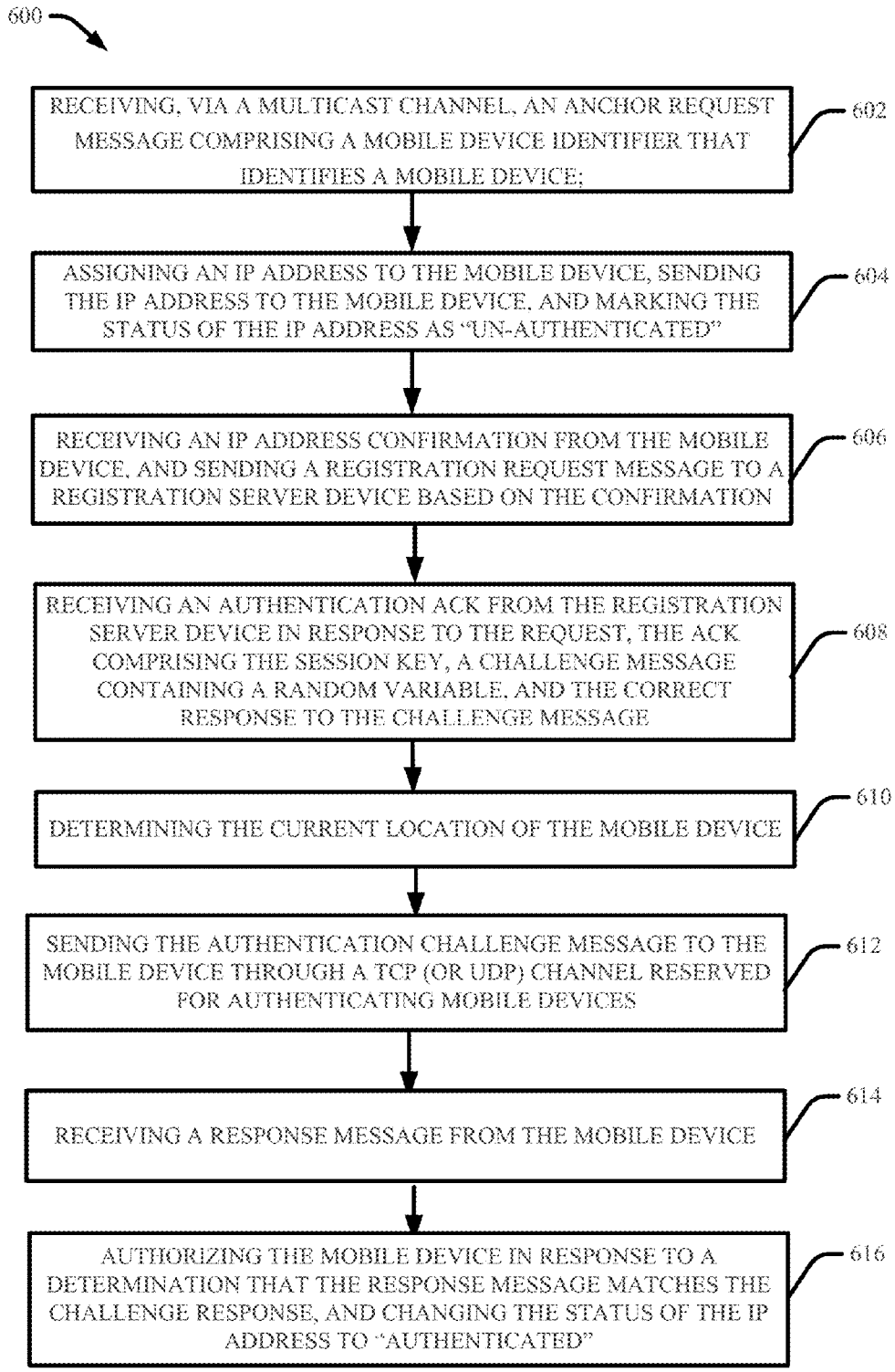
FIG. 6 presents an example method of dynamic anchoring and authentication performed by an anchor router in accordance with aspects and embodiments described herein.
Figure 7:
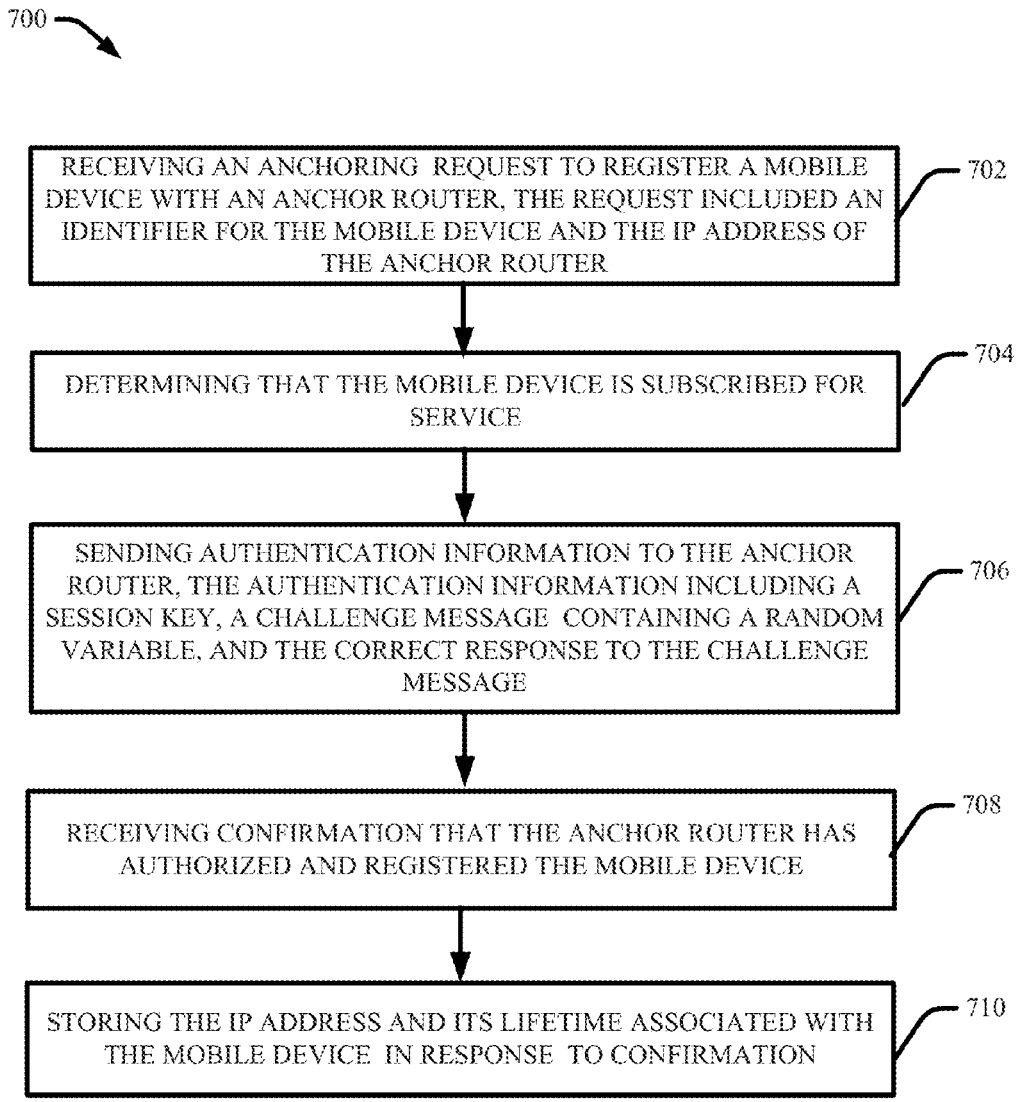
FIG. 7 presents an example method of dynamic anchoring and authentication performed by a RS in accordance with aspects and embodiments described herein.

FIGS. 5-7 illustrate flow diagrams and/or methods in accordance with the disclosed subject matter. For simplicity of explanation, the flow diagrams and/or methods included herein are depicted and described as a series of acts. It is to be understood and appreciated that the various embodiments are not limited by the acts illustrated and/or by the order of acts, for example acts can occur in various orders and/or concurrently, and with other acts not presented and described herein.

Referring now to FIG. 5, illustrated is an example method 500 of dynamic anchoring and authentication performed by a mobile device of network 100 in accordance with aspects and embodiments described herein. At 502, the mobile device (e.g., MN 102₁) receives, via a multicast channel, an anchor router advertisement sent by a nearby AR through the multicast channel. In an aspect, the specific multicast channel is designated by the network 100 for MN anchoring. At 504, the mobile device sends an anchoring request message back through the same multicast channel to the nearby AR. At 506, the mobile device receives, via the multicast channel, an assigned Internet protocol (IP) address from the nearby AR. Accordingly the nearby AR becomes the aAR for the mobile device. The anchor router is configured to provide wireless connection to an IP based communication network (e.g., core IP network 108) for devices located within its anchor cell. The mobile device is configured to employ the assigned IP address to connect to another router in response to movement of the mobile device to another cell, wherein the other router is configured to provide wireless connection to the IP based communication network for devices located within the other anchor cell.

At 508, the mobile device sends an IP address received confirmation message back to the anchor router. At 510, the mobile device receives an authentication challenge message from the anchor router. At 512, the mobile device uses a random variable contained in the challenge message and the pre-stored key shared between the MN and the RS to derive the same session key (e.g., Kc) created by the registration server and provided to the anchor router. At 514, the mobile device sends an authentication challenge response message back to the anchor router. At 516, the mobile device receives a confirmation of authentication from the anchor router in response to a determination, by the anchor router, that the authentication challenge response message is correct (e.g., that the authentication challenge response message includes the correct RES).

FIG. 6 illustrates an example method 600 of dynamic anchoring and authentication performed by an access router of network 100 in accordance with aspects and embodiments described herein. At 602, the router device receives, via a multicast channel, an anchoring request message from a mobile device including a mobile device identifier that identifies a mobile device. At 604, the anchor router assigns the IP address of the router device to the mobile device and marks the status of the IP address for the mobile device as "un-authenticated." At 606, after receiving an IP address received confirmation message from the mobile device, the anchor router sends a registration request to a registration server device (e.g., registration server 110). The registration request will include the mobile device identifier. At 608, the anchor router receives authentication (ACK) information from the registration server device in response to the request, the authentication information comprising the session key (Kc), a challenge message including a random variable (RAND), and the correct response to the challenge message (RES). At 610, the anchor router sends the authentication challenge message to the mobile device through a TCP or UDP channel reserved for authenticating mobile devices. At 612, the anchor router receives a challenge response message (e.g., including the RES) from the mobile device, and at 514, the anchor router authorizes the mobile device in response to a determination that the response message matches the encrypted challenge response and changes the status of the IP address assigned to the mobile device to "authenticated."

FIG. 7 illustrates an example method 700 of dynamic anchoring and authentication performed by the registration server 110 of network 100 in accordance with aspects and embodiments described herein. At 702, the registration server receives a registration request to register a mobile device with an anchor router. The request includes an identifier for the mobile device and the IP address of the anchor router. At 704, the registration server determines that the mobile device is subscribed for service provided by the registration server (e.g., the user of the mobile device has established an account with the registration server). At 706, in response to a determination that the mobile device is subscribed for service, the registration server then sends authentication information back to the anchor router. The authentication information includes a session key (Kc), a challenge message including a random variable (RAND), and the correct response to the challenge message (RES). At 708, the registration server receives confirmation that the anchor router has authorized and registered the mobile device with the IP address. Then at 710, the registration server stores information associating the mobile device with the IP address of the anchor router in response to the confirmation.

FIG. 8 presents a high level diagram 800 of a MN, an AR serving as the MN's aAR, and another AR serving the MN's current AR (cAR), in accordance with various aspects and embodiments of handoff-free IP based wireless communication network 100. Repetitive description of like elements employed in respective embodiments described herein is omitted for sake of brevity.

Diagram 800 includes MN $102_1$, AR $104_1$, AR $104_2$, and a core IP network 108. Diagram 800 particularly depicts aspects of a MN (e.g., MN $102_1$) and ARs (e.g., AR $104_1$ and AR $104_2$) of network 100 in association with establishing the one-hop ad-hoc access layer connection 106 with network 100 and employing network 100 to communicate (e.g., active call sessions) with other devices via the core IP network (e.g., the Internet).

The terms anchor access router (aAR), current access router (cAR), and previous access router (pAR) are used herein to denote the current relationship a MN has with an AR of network 100. As an example, in diagram 200, MN $102_1$ is wirelessly connected directly with the AR $104_1$ from which it received its assigned IP address. Accordingly, in diagram 200 AR $104_1$ is both the aAR and the cAR of MN $102_1$. However, in diagram 800, AR $104_1$ is serving as the aAR of MN $102_1$, and AR $104_2$ is serving as the cAR of MN $102_1$.

In accordance with one or more embodiments, as a MN (e.g., MN $102_1$) moves into a new cell of network 100, the MN and the AR of the new cell perform various activities to establish a layer-2 link and thereafter a layer-3 link. The access network being an ad hoc network means that no actions are required by a MN to establish a layer-2 link. The ARs of network 100 (e.g., ARs $104_{1-M}$) constantly emit layer-2 beacon signals (or packets) broadcasted through a MAC broadcast channel. This MAC broadcast channel that uses the same frequency throughout the network and contains the SSID of the network. The MN $102_1$ establishes the layer-2 link with an AR (e.g., AR $104_2$) simply by receiving/retrieving the MAC address of the AR. There is no probing, no authentication, and no association required for establishing a layer-2 link in the proposed network 100. The AR ad-hoc communication component 734 can be configured to send the beacon signals, and the MN ad-hoc communication component 206 can be configured to detect and interpret the beacon signal.

Layer-3 link establishment involves the formation of a one-hop layer-3 ad hoc connection between a MN and an AR, wherein the MN and the AR form a neighbor relationship. Because the connection between a MN and an AR is ad hoc, the MN can keep the same assigned IP address regardless of the AR via which the MN connects to in order to access the core IP network 108. In contrast, with conventional MIP a MN needs to acquire a new IP address (i.e., the so called care-of address) each time it connects to a new AR. In addition, because the access layer connection between a MN and an AR is single hop, the network 100 does not require the ARs to operate using ad-hoc routing protocols. The control packets exchanged between MNs and ARs for implementing the ad hoc access network layer are shown in FIG. 3. The control packets are transmitted through a UDP port and a multicast IP address known to all nodes in the network 100.

Layer-3 link establishment is characterized herein as the establishment of a "neighbor" relationship between a MN and an AR. Layer-3 link establishment involves the exchange of only three control packets between the MN and its cAR. An AR (e.g., AR $104_2$) constantly (e.g., one every 100 ms), emits layer-3 Hello packets. The Hello control packets sent by an AR are called aHellos. In an aspect, the outer advertisement message previously described (e.g., step 302 of diagram 300), is synonymous with an aHello. The AR ad hoc communication components 214 and 808 in AR $104_1$ and AR $104_2$, respectively, are configured to emit aHellos.

Figure 9:
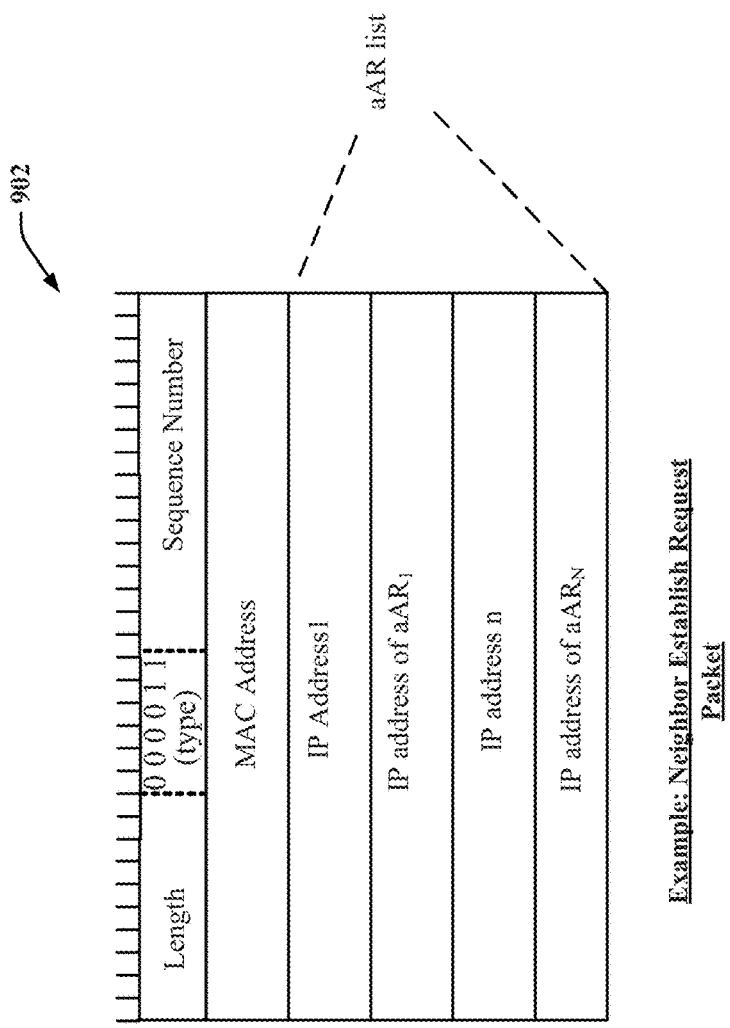
FIG. 9 presents an example neighbor establish request packet sent by a MN of the disclosed handoff-free IP based wireless communication network in association with establishing an one-hop layer-3 ad hoc connection, in accordance with various aspects and embodiments described herein.

When a MN get close to a new cell, it will receive an aHello from the AR of the new cell. The MN can establish the neighbor relationship with the AR by sending in a Neighbor Establish Request packet to the AR. FIG. 9 presents an example Neighbor Establish Request packet 902 sent from a MN. If the MN has multiple interfaces and multiple IP addresses acquired from different aARs, it includes all the IP addresses and the IP address of its aARs in the Neighbor Establish Request packet. In an aspect, the new AR (e.g., cAR $104_2$) is configured to send back an ACK to the first IP address listed in the Neighbor Establish Request message. With reference back to FIG. 8, the MN ad-hoc communication component 204 is configured to transmit Neighbor Establish Request packets to ARs. Once a MN becomes a neighbor with an AR, the MN and its IP addresses will be added to the neighbor MN list (nMNL) of the AR. The steps taken by a MN and an AR for neighbor establishment are summarized in FIGS. 10 and 11.

Figure 10:
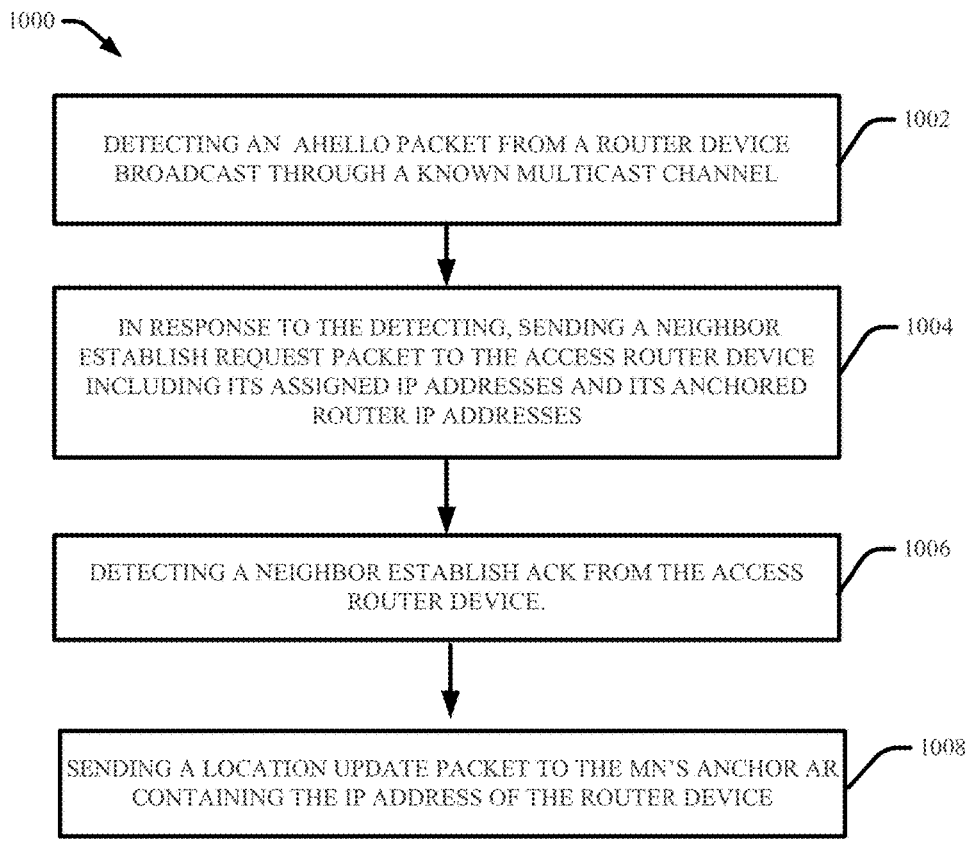
FIG. 10 presents a flow diagram of an example method for establishing a one-hop layer-3 ad hoc connection between a MN and an AR of the subject IP based wireless communication network in accordance with aspects and embodiments described herein.

FIG. 10 presents a flow diagram of an example method 1100 for establishing a one-hop layer-3 ad hoc connection between a MN and an AR of the subject IP based wireless communication network in accordance with aspects and embodiments described herein. Method 1000 is performed by the MN. At 1002, the mobile device detects a first router control packet (e.g., an aHello packet) sent from a router device through a known multicast channel. The aHello packet includes at least a router IP address for the router device. At 1004, in response to the detection of the first router control packet (e.g., the aHello), the mobile device sends a neighbor establish request packet to the router device (e.g., packet 902), including its assigned IP addresses and its anchor router IP addresses. At 1006, the mobile device detects a neighbor establish acknowledgement (ACK) control packet from the router device. Then at 1008, the mobile device sends a location update packet to its anchor AR via the router device and containing the IP address of the router device, thereby declaring the router device its cAR.

Figure 11:
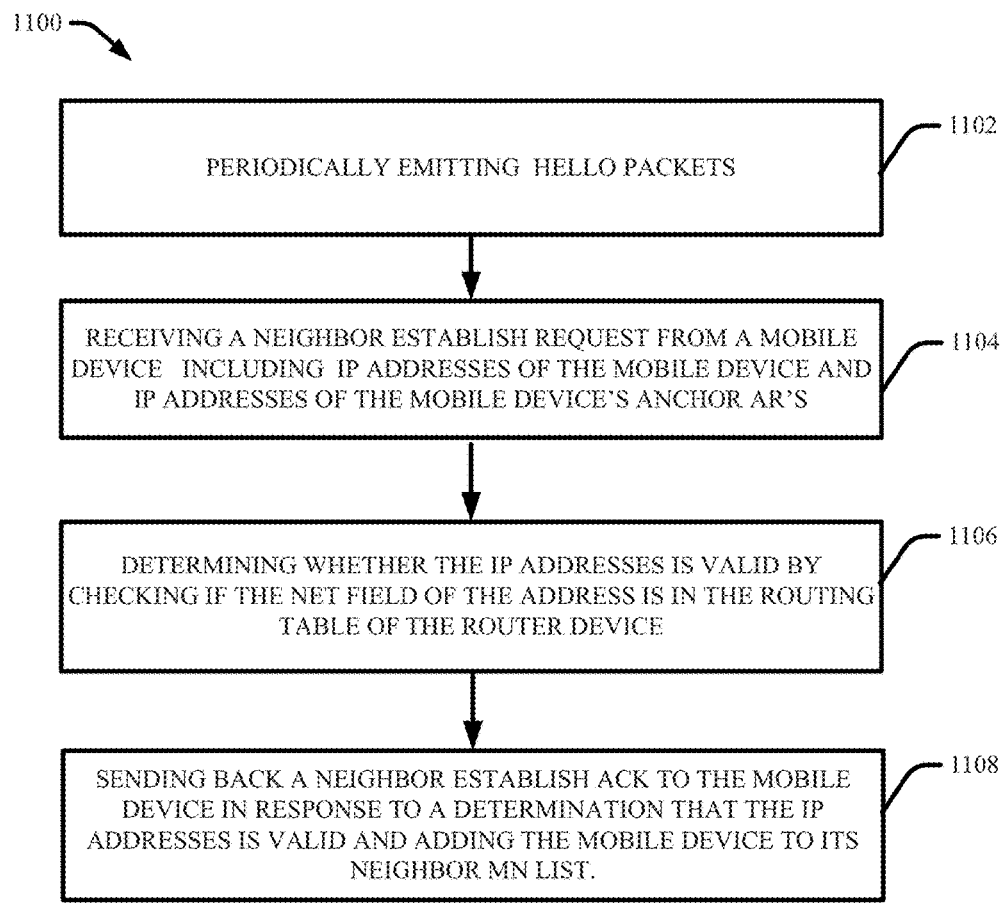
FIG. 11 presents another flow diagram of an example method for establishing a one-hop layer-3 ad hoc connection between a MN and an AR of the subject IP based wireless communication network in accordance with aspects and embodiments described herein.

FIG. 11 presents a flow diagram of another example method 1100 for establishing a one-hop layer-3 ad hoc connection between a MN and an AR of the subject IP based wireless communication network in accordance with aspects and embodiments described herein. Method 1100 is performed by the AR. At 1102, the router device periodically emits first router control packet (e.g., aHello packets) including a router IP address for the router device. At 1104, the router device receives a neighbor establish request from a mobile device including the mobile devices IP addresses and its corresponding aAR IP addresses. Then at 1106, the router device determines whether the IP addresses are in a routing table accessible to the router device. At 1108, in response to a determination that the net prefixes of the IP addresses are in the routing table, the router device then sends the mobile device a neighbor establish acknowledgment message and adds the mobile device to its neighbor MN list.

Figure 12:
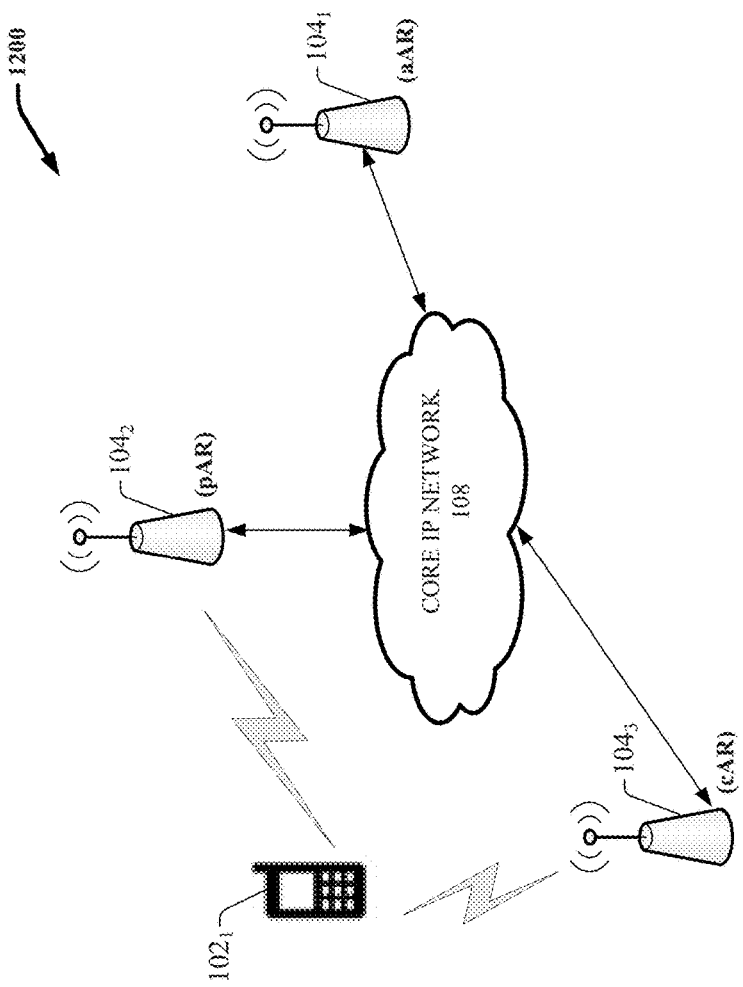
FIG. 12 presents a diagram demonstrating the relationship between a MN, and its aAR, its prior AR (pAR), and its cAR in accordance with various aspects and embodiments described herein.

FIG. 12 presents a diagram 1200 demonstrating a macrodiversity relationship between a MN, is aAR, its pAR, and its cAR in accordance with various aspects and embodiments described herein. Repetitive description of like elements employed in respective embodiments described herein is omitted for sake of brevity The MNs of network 100 (e.g., MN 102₁) also constantly broadcast a Hello (called a mHello) packet through another pre-defined multicast channel and the mHello also contains all the IP addresses associated with the MN. If mHellos from a particular MN are not received by an AR (e.g., cAR 104₂) for a certain period of time, the AR will assume the MN is no longer in the cell and will remove it from its nMNL. Similar to the nMNL, a MN also keeps all the neighbor ARs in a table, called neighbor AR list (nARL), (e.g., in MN memory 206). When a MN no longer receives aHellos from a neighbor AR, it will remove the AR from its nARL.

It is important to note that when a MN can establish a neighbor relationship with a new AR, it is still connected to its old cAR (or pAR). In other words, the MN is connected to both ARs simultaneously. It will continue to use the old cAR until the layer-2 beacon signal from new AR indicates that the RSSI (receiving signal strength indicator) of the new AR is equally or stronger than the RSSI of the old cAR. The MN will switch its cAR by sending a location update packet to the aAR. This packet can be transmitted through either the old or the new cAR. Since the packet is encrypted, the aAR can verify the authenticity of the location update packet. At this time, the MN's old cAR is referred to as its previous AR (pAR). Now the MN enters a "macrodiversity" mode during which the MN can use either the cAR or the pAR to transmit packets to the aAR. Similarly, the MN can also receive packets from both the cAR and the pAR. This is particularly important as some packets have already been transmitted out to the pAR when the MN switch its cAR. To increase reliability, the aAR can even send out two copies, one to the pAR and one to cAR, for a certain amount of time after location update. Although this mechanism results in potential reception by a MN of two copies of the same data packet during that period, this issue can be resolved with the IP protocol.

Diagram 1200 shows three ARs, AR 104₁, AR 104₂, and AR 104₃. As MN 102₁ moves further away, it is no longer a neighbor of its aAR, AR 104₁. Instead, it is now a neighbor of AR 104₂ and AR 104₃, the former is the pAR and the latter the cAR. MN 102₁ can use either AR 104₂ and AR 104₃ to send a packet to or receive a packet from AR 104₁ (i.e. the aAR). AR 104₁ can also send two copies, one to AR 104₂ and one to AR 104₃, for a short interval after location update has been received. This macrodiversity feature of network 100 ensures little or no packet loss when a MN moves from cell to cell.

Because all packets are sent back to the aAR of a MN (i.e. reverse tunneling), this allows the new cAR to outsource authentication to the aAR and no authentication needs to be performed by a new cAR. The new cAR only checks if aARs' IP addresses are valid or not. If valid, the prefixes of an aAR's IP address must be in the routing table. If the net prefix of the aAR IP address of a MN is not in the routing table, the neighbor establishment request from the MN is rejected. The authentication done by the aAR is also straightforward. If the MN has not passed the authentication process, the IP address assigned to the MN can only be used to send traffic through a specific port (TCP or UDP) for authentication only. This allows the authentication process described in FIGS. 2 and 4 to be completed in the new cell. If the MN uses a fake IP address, then the MN obviously do not have the session key Kc and the aAR will not be able to decrypt the received packet. As a result, the aAR will drop the packet successfully. If several packets from the same MN cannot be decrypted, the aAR sends a warning message to the cAR to block the future transmissions from the MN.

As an example, with reference back to FIG. 8, AR 104₁ in diagram 800 is the aAR and the cAR of MN 102₁. Therefore, MN 102₁ is in both the nMNL and the aMNL of AR 104₁. In the beginning, MN 102₁ can only receive aHellos from AR 104₁. As MN 102₁ moves close to AR 104₂, it will begin to receive aHellos from AR 104₂. The MN 102₁ will then instruct MN ad-hoc communication component 204 to send a Neighbor-Establish-Request message to AR 104₂. In response to the received request message, MN 102₁ will instruct ad-hoc communication component 734 to send a neighbor-establish-ACK to MN 102₁, and thus establish a neighbor relationship between the two. Now MN 102₁ is connected to both AR 104₁ and AR 104₂, but the cAR is still AR 104₁.

When MN 102₁ gets closer to AR 104₂, the received beacon signals strength AR 104₂ can become stronger than the signal strength from AR 104₁. MN 102₁ now decides to switch its cAR to AR 104₂ by sending a location update packet to its aAR: AR 104₁ with the IP address of AR 104₂. AR location update component 804 in AR 104₁ is configured to receive and process location update messages. If a MN (e.g., MN 102₁) and the aAR (e.g., AR 104₁) have not completed the authentication process, the MN location update component 802 will instruct MN encryption/decryption component 208 not to encrypt the location update message. However, if the MN already has already been authenticated, the MN location update component 802 is configured to use MN encryption/decryption component 208 to encrypt the location update control message with the session key Kc established during authentication.

In response to a determination that the MN has already been authenticated (e.g., based on information stored in aAR about any anchored IP address), the AR encryption/decryption component 218 is configured to decrypt the location update message using the stored session key Kc for the MN and hand it over to the AR location update component 804. Included in the location update message is the IP address of the MN's cAR. AR location update component 804 will change the corresponding location information in the aMNL residing in AR memory 216. In another aspect, if the AR location update component 804 determines that the MN (e.g., MN 102₁) has been authenticated yet the location update control message is not encrypted, the AR location update control component 804 is configured to reject the location update control message.

Following the location update packet, the MN 102₁ can start sending regular encrypted data transmissions right after the location update message. The cAR (i.e. AR 104₂) will just forward the packet to the aAR (e.g., AR 104₁) through its IP-core communication component 812. AR 104₁ decrypts received data packet with the encryption/decryption component 218 and instruct the IP-core communication component 212 to send the decrypted packet through the core IP network 108 (e.g., the Internet) to the aAR of the destination MN (e.g., for example, see FIG. 13, cAR MN2).

As MN 102$_1$ moves further away from AR 104$_1$, the latter can no longer hear the mHello sent from MN ad-hoc communication component 204. When that happens, AR 104$_1$ will remove MN 102$_1$ from its nMNL, but still keep it in the aMNL.

Figure 13:
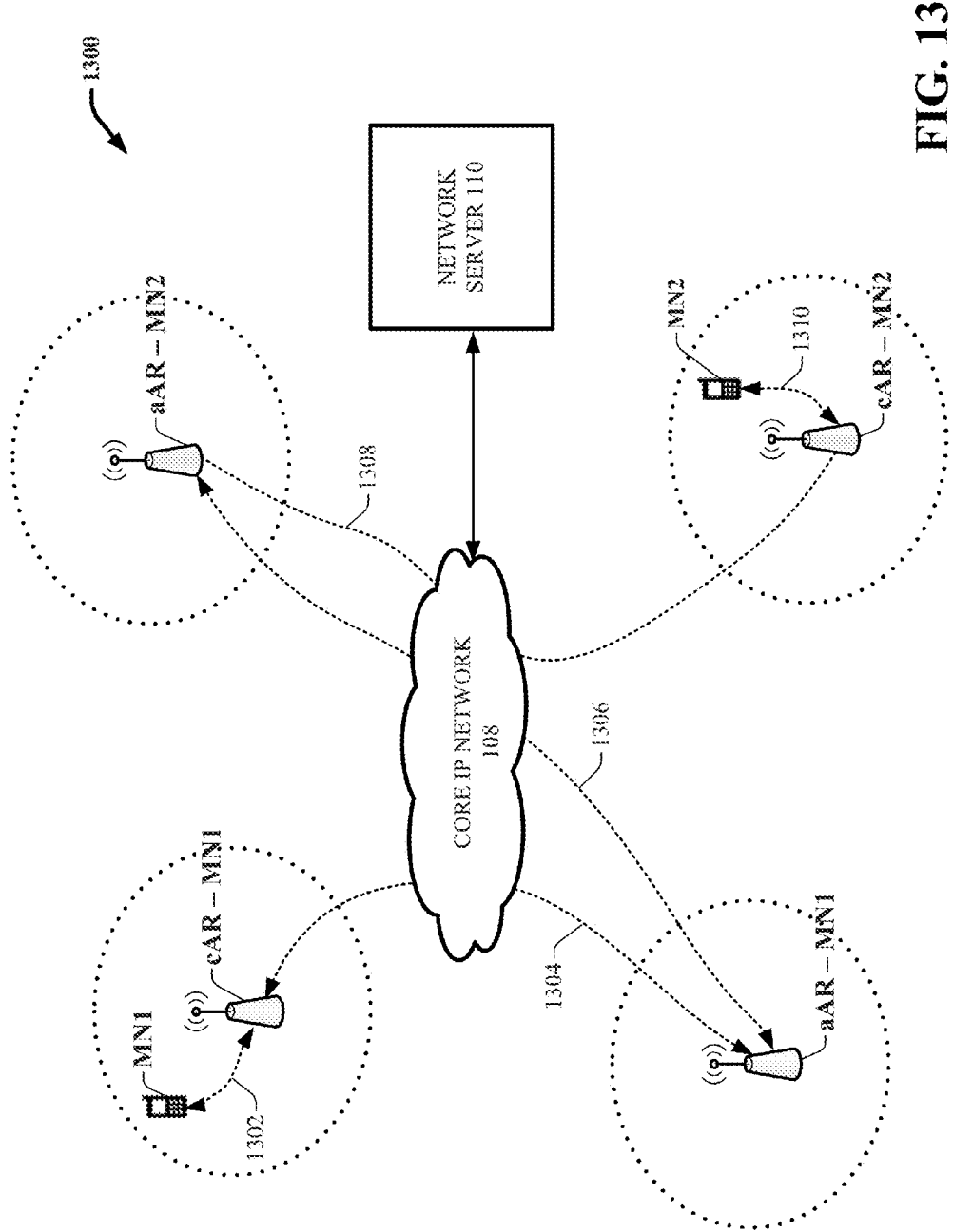
FIG. 13 provides a diagram exemplifying data transmission associated with establishing an active media session between two MNs via the subject IP based wireless communication network in accordance with aspects and embodiments described herein.

FIG. 13 presents a diagram 1300 exemplifying data transmission associated with establishing an active session (e.g., voice of voice and video call) between two MNs via network 100 in accordance with aspects and embodiments described herein. Diagram 1300 includes two MNs, MN1 and MN2, and four ARs, the cAR of MN1, the aAR of MN1, the aAR of MN2 and the cAR of MN2. The MNs and ARs can include the various features and functionalities of the other MNs (e.g., MN 102$_{1-N}$) and ARs (e.g., ARs 104$_{1-M}$) described herein. Repetitive description of like elements employed in respective embodiments described herein is omitted for sake of brevity.

In FIG. 13, MN1 and MN2 are employing network 100 to conduct an active IP based data session with one another. When MN1 has a data packet to send to MN2, the MN1 encrypts the data playload with the Kc of MN1 and address this data packet to MN2 as the recipient. The MN1 then transmits the data packet to its cAR via the wireless layer-3 ad hoc channel 1302 established between the MN1 and its cAR. An additional IP header to implement 1302 is added where the source address=MN1 and destination address=cAR of MN1. Upon reception of the encrypted data packet, the cAR of MN1 forwards the data packet to the aAR of MN1 via the core IP network 108 using communication channel/tunnel 1304. The source address of tunnel 1304's IP header=cAR of MN1, and the destination address=aAR of MN2. Upon reception of the data packet, the aAR of MN1 is configured to decrypt the data packet using Kc of MN1. The aAR of MN1 then sends the decrypted data packet to the aAR of MN2 via the core IP network 108 using communication channel/tunnel 1306. The source address of tunnel 1306's IP header=aAR of MN1, and the destination address=aAR of MN2.

Upon reception of the decrypted data packet, the aAR of MN2 is configured to re-encrypt the data packet using the session key Kc for MN2 and then send the re-encrypted data packet to the cAR of MN2 via the core IP network 108 using communication channel/tunnel 1308. The source address of tunnel 1308's IP header=aAR of MN2, and the destination address=cAR of MN2.

Upon reception of the re-encrypted data packet, the cAR of MN2 is configured to forward the re-encrypted data packet to MN2 using the layer-3 ad hoc communication link 1310. The source address of link 1310's IP header=cAR of MN2, and the destination address=MN2.

When the MN2 receives the re-encrypted data packet, it can then decrypt it using the Kc of MN2.

The transmission from a MN's cAR back to its aAR (e.g., the cAR of MN1 to the aAR of MN1 via the layer-3 ad hoc link 1302) is sometimes called reverse tunneling. In MIP, reverse tunneling is sometimes used when a router imposes a restriction that the source address of a data packet must match the net prefix of the broadcast domain controlled by the router. However, with network 100, reverse tunneling is used for a entirely different reason. In particular, session keys Kc are anchored at the aARs. This feature allows cARs to outsource link encryption and MN authentication to aARs and remove key transferring activities in conventional handoffs. As explained previously, the dynamic anchoring process employed by network 100 assures that a MN and its aAR reside in a geographically limited area. Accordingly, any delay introduced by reverse tunneling in the proposed architecture is negligible.

Figure 14:
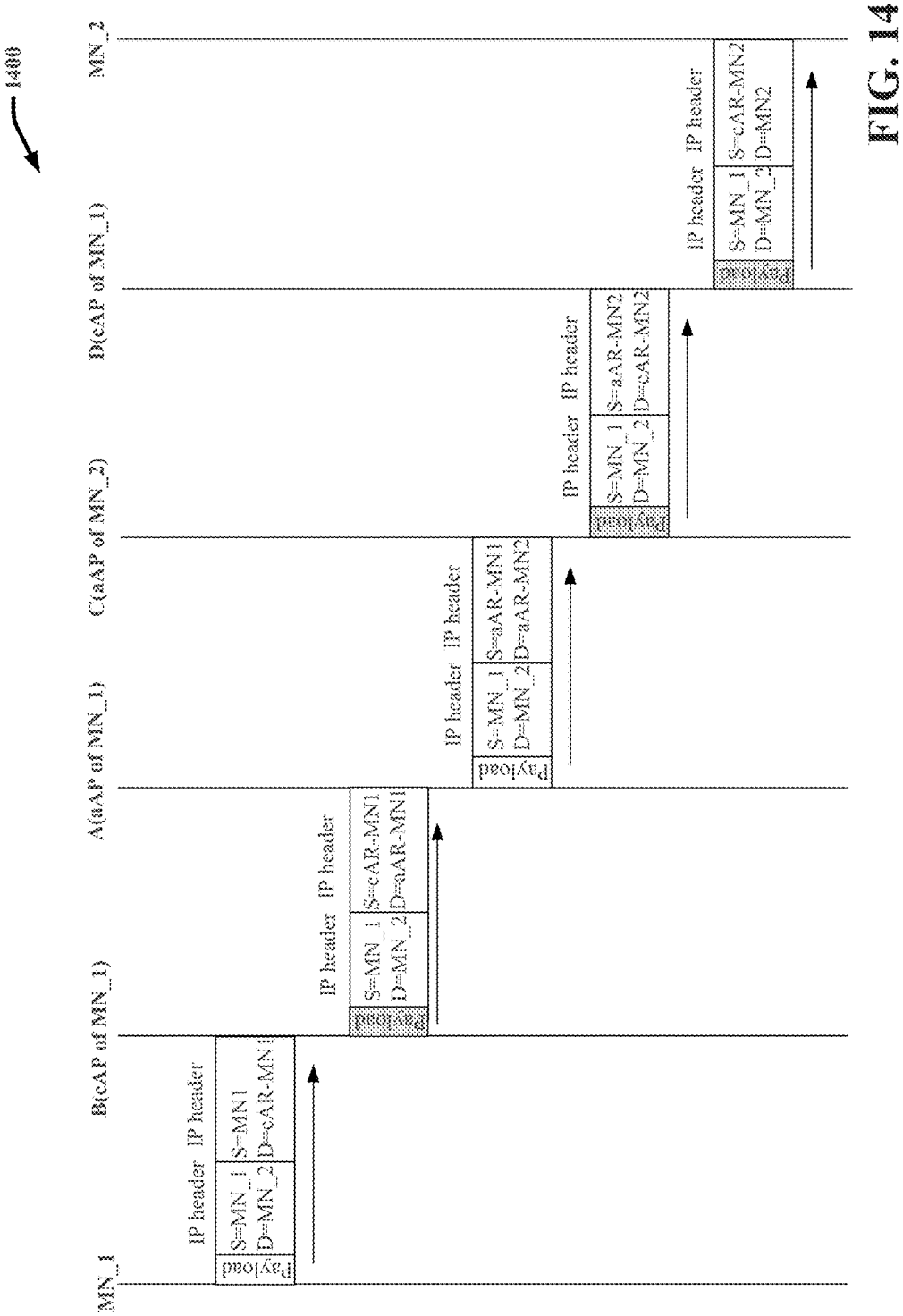
FIG. 14 provides a ladder diagram exemplifying data transmission associated with establishing an active media session between two MNs via the subject IP based wireless communication network in accordance with aspects and embodiments described herein.

FIG. 14 presents a ladder diagram 1400 exemplifying the data transmission associated with establishing the active data session between MN1 and MN2 via network 100, as presented in diagram 1400, in accordance with aspects and embodiments described herein. In diagram 1400, the rectangular boxes correspond to data packets. Each of the payloads in gray correspond to encrypted data. The initial S and D of the IP headers respectively correspond to source and destination. One additional header to implement a connection in the ad hoc access network, or to implement a tunnel in the IP core network is added to a data packet. The source and destination addresses of the additional header are also shown in diagram 1400. Repetitive description of like elements employed in respective embodiments described herein is omitted for sake of brevity.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device, comprising:
a memory that stores computer executable components;
a processor that executes at least the following computer executable components stored in the memory:
an anchoring/authentication component configured to perform a dynamic anchoring process with a first router device of an Internet Protocol (IP) communication network in association with a first establishment of a first ad-hoc wireless connection between the mobile device and the first router device using a local IP address, wherein the dynamic anchoring process results in designation of the first router device as an anchor router for the mobile device and assignment of a public IP address to the mobile device by the first router device; and
an ad-hoc communication component configured to facilitate a second establishment of a second ad-hoc wireless connection with a second router device of the IP communication network based on movement of the mobile device away from the first router device, and wherein the ad-hoc communication component is configured to receive authorization to establish the second ad-hoc wireless connection with the second router device based on an authentication procedure performed between the mobile device and the first router device using the second router device as a relay, wherein the authentication procedure is responsive to initiation of the second establishment of the second ad-hoc wireless connection, and wherein the authentication procedure comprises authenticating the mobile device based on the public IP address.

2. The mobile device of claim 1, wherein the public IP address is associated with an expiration time and wherein the ad-hoc communication component is configured to maintain usage of the public IP address in association with establishment of ad-hoc wireless connections with router devices of the IP communication network, including the first router device and the second router device, until occurrence of the expiration time.

3. The mobile device of claim 1, wherein the ad-hoc communication component is configured to initiate the second establishment of the second ad-hoc wireless connection with the second router device based on reception of a router control packet from the second router device including an IP address of the second router device, wherein in response to the reception of the router control packet, the ad-hoc communication component is configured to:
  transmit a neighbor establish control message to the second router device via a first multicast channel,
  receive a neighbor establish acknowledgment message from the second router device, and in response to reception of the neighbor establish acknowledgment message,
  transmit a location update control packet to the first router device, the location update packet comprising the IP address of the second router device.

4. The mobile device of claim 1, wherein the ad-hoc communication component is configured to establish the second ad-hoc wireless connection with the second router device while maintaining the first ad-hoc wireless connection with the first router device.

5. The mobile device of claim 4, wherein the ad-hoc communication component is configured to receive data packets, sent from a single origin device to the mobile device, via the first ad-hoc wireless connection and the second ad-hoc wireless connection.

6. The mobile device of claim 4, wherein the ad-hoc communication component is configured to disable the first ad-hoc wireless connection with the first router device in response to a determination that a router control packet is not received from the first router device for a defined period of time.

7. A first router device of an Internet Protocol (IP) based communication network, comprising:
  a processor; and
  a memory that stores executable instructions that, when executed by the processor, facilitate performance of operations comprising:
    receiving an anchoring request message from a mobile device in association with establishment of a first ad-hoc wireless connection with the mobile device using a local IP address of the mobile device;
    performing a dynamic anchoring procedure based on reception of the anchoring request message, wherein the performing the dynamic anchoring procedure comprises performing a first authentication procedure for authenticating the mobile device and assigning a public IP address to the mobile device; and
    operating as an anchor router for the mobile device based on completion of the dynamic anchoring procedure, wherein the operating as the anchor router for the mobile device comprises performing a second authentication procedure for authenticating the mobile device in association with establishment of second ad-hoc wireless connections between the mobile device and second router devices of the IP based communication network, wherein the performing the second authentication procedure is responsive to reception of authentication requests that were forwarded by the second router devices to the anchor router in response to initiation of the establishment of the second ad-hoc wireless connections.

8. The first router device of claim 7, wherein the performing the first authentication procedure comprises receiving authentication information from a registration server device of the IP based communication network and employing the authentication information to establish a session key that is shared between the mobile device, the first router device and the registration server device.

9. The first router device of claim 8, wherein the facilitating the second authentication procedure comprises:
  receiving, from a second router device of the second router devices in association with establishment of a second wireless ad-hoc connection of the second wireless ad-hoc connections, a location update packet sent by the mobile device and IP address information corresponding to a current location of the mobile device;
  verifying authorization of the mobile device based on decryption of the location update packet using the session key, and
  storing the IP address information corresponding to the current location of the mobile device.

10. The first router device of claim 8, wherein the operating as the anchor router for the mobile device comprises:
  receiving a data packet transmitted by the mobile device to a destination device via a second ad-hoc wireless connection of the second ad-hoc wireless connections prior to reception of the data packet by the destination device;
  decrypting the data packet using the session key, resulting in a decrypted data packet; and
  sending the decrypted data packet to a third router device operating as another anchor router for the destination device for forwarding, by the third router device, to the destination device in an encrypted form.

11. The first router device of claim 8, wherein the operating as the anchor router for the mobile device comprises:
  encrypting, using the session key, data packets for transmission to the mobile device via the second ad-hoc wireless connections, resulting in encrypted data packets; and providing the encrypted data packet to the second router devices for forwarding to the mobile device via the second ad-hoc wireless connections.

12. The mobile device of claim 1, wherein based on the assignment of the public IP address to the mobile device by the first router device, the ad-hoc communication component is further configured to employ the public IP address for the mobile device in association with establishment of one or more third ad-hoc wireless connections with one or more router devices of the IP communication network, including the first router device and the second router device.

13. The mobile device of claim 1, wherein the first ad-hoc wireless connection and the second ad-hoc wireless connection comprise layer-3 connections, respectively.

14. The mobile device of claim 1, wherein the first ad-hoc wireless connection and the second ad-hoc wireless connection comprise one-hop connections, respectively.

15. The mobile device of claim 1, wherein the establishment of the first ad-hoc wireless connection between the mobile device and the first router device and the assignment of the first router device as the anchor router for the mobile device is based on the mobile device and the first router device being within a defined geographical area.

16. The mobile device of claim 1, wherein the dynamic anchoring process also results in establishment of a session key shared between the mobile device, the first router device, and a registration server device of the IP communication network, and wherein the ad-hoc communication component is configured to receive the authorization based on decryption of an authorization challenge message using the session key, wherein the authorization challenge message was sent to the mobile device by the first router device and relayed to the mobile device by the second router device based on the first router device being the anchor router for the mobile device.

17. The mobile device of claim 1, wherein the dynamic anchoring process also results in establishment of a session key shared between the mobile device, the first router device, and a registration server device of the IP communication network, and wherein the computer executable components further comprise:

an encryption/decryption component configured to employ the session key to encrypt and decrypt user data packets respectively sent to and received by the mobile device using the second ad-hoc wireless connection.

18. The mobile device of claim 1, wherein the ad-hoc communication component is configured to maintain the first ad-hoc wireless connection at least until the second ad-hoc wireless connection is authenticated using authentication information provided by the first router device to the second router device in response to connection of the mobile device to the second router device.

19. The first router device of claim 7, wherein based on assignment of the public IP address to the mobile device, the mobile device is configured to maintain usage of the public IP address in association with the establishment of the second ad-hoc wireless connections with the second router devices.

20. The first router device of claim 7, wherein the first ad-hoc wireless connection and the second ad-hoc wireless connections comprise layer-3 connections, respectively.

21. The first router device of claim 7, wherein the first ad-hoc wireless connection and the second ad-hoc wireless connections comprise one-hop connections, respectively.

22. The first router device of claim 7, wherein the receiving the anchoring request message from the mobile device and the operating as the anchor router for the mobile device is based on the mobile device and the first router device being within a defined geographical area.

23. The first router device of claim 8, wherein the facilitating the second authentication procedure comprises, in association with establishment of a second ad-hoc wireless connection of the second ad-hoc wireless connections between the mobile device and a second router device of the second router devices:

receiving an authentication request message from the second router device; and in response to the receiving the authentication request message, sending an authentication challenge message to the second router device.

24. The first router device of claim 23, wherein the authentication challenge message comprises encrypted challenge information encrypted with the session key and response information, wherein decryption of the encrypted challenge information using the session key results in extraction of the response information, and wherein based on the sending the authentication challenge message, the second router device is configured to provide the encrypted challenge information to the mobile device, and wherein the second router device is configured to authorize the second ad-hoc wireless connection in response to reception of the response information from the mobile device.

25. A method comprising:

performing, by a mobile device comprising a processor, a dynamic anchoring process with a first router device of an Internet Protocol (IP) communication network in association with establishment of a first ad-hoc wireless connection between the mobile device and the first router device using a local IP address, wherein the performing the dynamic anchoring process comprises:

receiving a first assignment of the first router device as an anchor router for the mobile device, and receiving a second assignment of a public IP address for the mobile device by the first router device; and based on the performing the dynamic anchoring process:

employing, by the mobile device, the public IP address in association with establishment of one or more second ad-hoc wireless connections with one or more second router devices of the IP communication network; and receiving, by the mobile device, authorization to establish the one or more second ad-hoc wireless connection with the one or more second router devices based on performance of an authentication procedure between the mobile device and the first router device using the one or more second router devices as a relay, wherein the authentication procedure is responsive to initiation of the establishment of the one or more second ad-hoc wireless connections, and wherein the authentication procedure comprises authenticating the mobile device based on the public IP address.

26. The method of claim 25, wherein the first ad-hoc wireless connection and the one or more second ad-hoc wireless connection comprise layer-3 connections, respectively.

27. The method of claim 25, wherein the first ad-hoc wireless connection and the one or more second ad-hoc wireless connection comprise one-hop connections, respectively.

28. The method of claim 25, wherein the performing the dynamic anchoring process is based on the mobile device and the first router device being within a defined geographical area.

29. The method of claim 25, further comprising:

initiating, by the mobile device, the authentication procedure based on connection of the mobile device to the one or more second router devices, respectively, and based on the first router device being designated as the anchor router for the mobile device.

30. The method of claim 25, wherein the performing the dynamic anchoring process further comprises generating a session key that is shared between the mobile device, the first router device and a registration server device of the IP communication network.

31. The method of claim 30, wherein the receiving the authorization is based on decryption of an authorization challenge message using the session key, wherein the authorization challenge message was sent to the mobile device by the first router device and relayed to the mobile device by the second router device based on the first router device being the anchor router for the mobile device.

32. The method of claim 30, further comprising:

employing, by the mobile device, the session key to encrypt and decrypt user data packets respectively sent to and received by the mobile device using the one or more second ad-hoc wireless connections.

33. The method of claim 25, further comprising:
establishing, by the mobile device, a second ad-hoc wireless connection of the one or more second ad-hoc wireless connections with a second router device of the one or more second router devices;
maintaining, by the mobile device, the first ad-hoc wireless connection and the second ah-hoc wireless connection; and
receiving, by the mobile device, data packets, sent from a single origin device to the mobile device, via the first ad-hoc wireless connection and the second ad-hoc wireless connection.

34. The method of claim 25, further comprising:
establishing, by the mobile device, a second ad-hoc wireless connection of the one or more second ad-hoc wireless connections with a second router device of the one or more second router devices; and
maintaining, by the mobile device, the first ad-hoc wireless connection and the second ah-hoc wireless connection at least until the second ad-hoc wireless connection is authenticated using authentication information provided by the first router device.

35. The first router device of claim 8, wherein the operating as the anchor router for the mobile device further comprises handling, instead of the second router devices and using the session key, encryption and decryption of data packets communicated between the mobile device and another device via the second ad-hoc wireless connections.

* * * * *